Aug. 27, 1946.　　　　G. LONG　　　　2,406,698
CAGING MECHANISM
Filed June 14, 1943

INVENTOR:-
GEORGE LONG
BY Arthur R. Wylie ATTY.

Patented Aug. 27, 1946

2,406,698

UNITED STATES PATENT OFFICE 2,406,698

CAGING MECHANISM

George Long, St. Louis Park, Minn., assignor to General Mills, Inc., a corporation of Delaware Application June 14, 1943, Serial No. 490,956

7 Claims. (Cl. 74—5)

This invention relates to gyros and more particularly to mechanism for restoring a gyro to a given normal position, as vertical. It is intended particularly for use on gyro vertical apparatus for use on shipboard and is intended to quickly return the gyro to a normal vertical position after it has been moved therefrom by reason of overtravel caused by excessive roll of a vessel instead of allowing the gyro slowly to return to that position by its own inherent action.

An object of the invention is to provide means for quickly returning the spin axis of a gyro to a given normal position as vertical, from any other position the shaft may have assumed.

This and other objects as will hereinafter appear are accomplished by this invention which is fully described in the following specification and shown in the accompanying drawing in which Figure 1 is a perspective of a gyro embodying my invention showing the restoring members in closed position;

Figure 3:
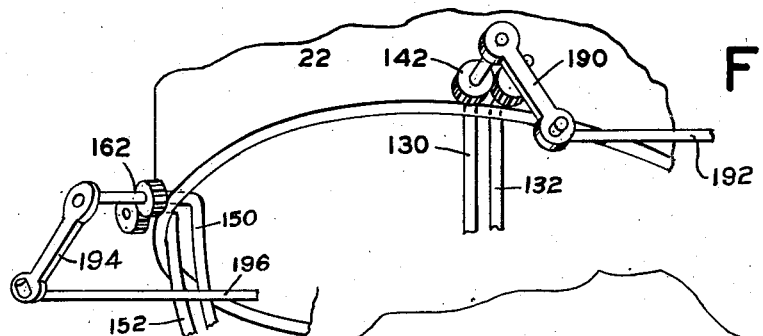
Fig. 3 is a partial view similar to Fig. 2 showing means for separately operating pairs of restoring members.

The embodiment illustrated comprises a gyro shown diagrammatically as having a rotor 10 secured on a shaft 12, the latter being suitably journaled in an inner gimbal 14 which is mounted on trunnions 16 which in turn are journaled in an outer gimbal 18 which has trunnions 20 set at right angles to the trunnions 16 and which in turn are journaled in a housing 22.

The shaft 12 is driven in any desired manner by means not shown which are well known and forms no part of the invention. A pin 15 extends beyond the gimbal 14 and axially in line with the shaft 12 so as to be engageable by two sets of restoring members set at right angles to each other and which are preferably mounted to rotate about axes 45° from the trunnions 16 and 20. Thus semicircular restoring members 30, 32 have oppositely extending spaced shaft portions 34, 36 at one end and similar portions 38, 40 at the other which are suitably journaled in the housing 22 at substantially the same level as the trunnions 16 and 20. Meshing pairs of gears 42, 44 keyed on these spaced shaft portions cause the restoring members 30, 32 to oscillate in opposite directions at equal rates.

Another pair of restoring members 50, 52 at right angles to the members 30, 32 have oppositely extending spaced shaft portions 54, 56 at one end and similar portions 58, 60 at the other, all journaled in the housing 22 and having pairs of gears 62, 64 keyed thereon to cause these members to oscillate in opposite directions at equal rates.

Figure 1:
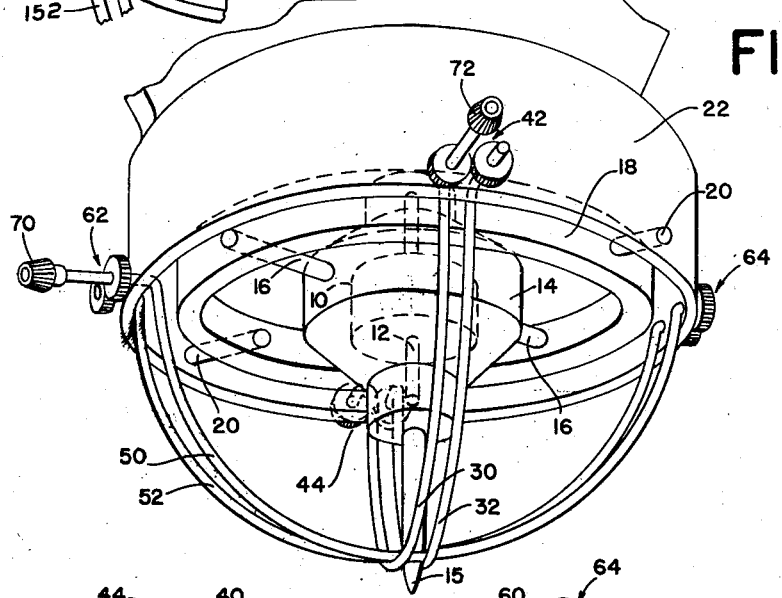

Bevel gears 70, 72 keyed on the ends of the shafts 34 and 54 mesh with bevel gears 74, 76 keyed on a shaft 78 which is suitably journaled on the housing 22 and is caused to oscillate by any suitable means such as a lever 80 and a toggle 82 operated by a rod 84 slidably mounted in a frame member 86. Thus, moving the rod 84 to the right causes all the restoring members to move to the open position shown in Fig. 2 while moving it to the left causes these members to assume the closed position shown in Fig. 1 in which the pin 15 and inner gimbal 14 are urged toward their neutral or vertical positions wherein the gyro is centered.

Figure 2:
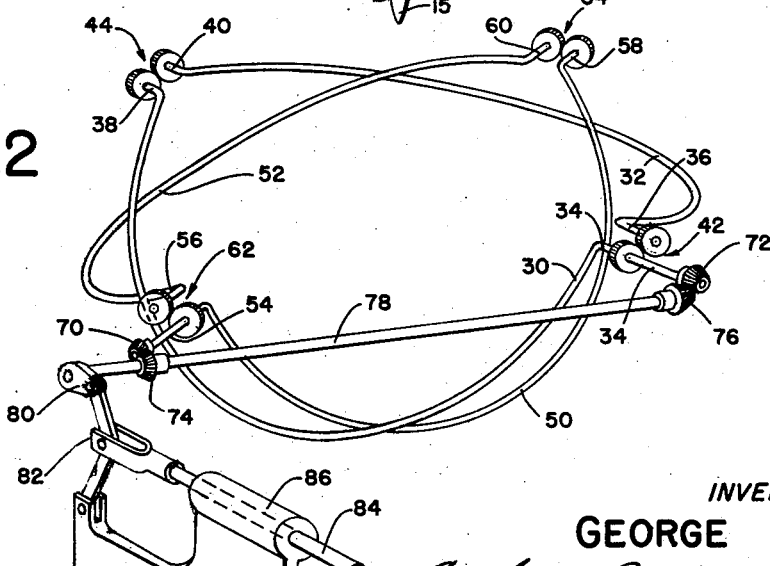
Fig. 2 is a perspective of the restoring apparatus and its drives removed from the gyro and showing the restoring members in open position.

It will be understood of course that during much of the time the caging mechanism here shown and described may be retracted to the position shown in Fig. 2 so as not to interfere with the normal operation of the gyro and may be brought into play only when it is desired to quickly return the gyro to a predetermined position.

Thus it will be seen I have provided a very simple and effectual means for restoring the shaft of a gyro to its normal position.

While I have shown the pairs of restoring members acting simultaneously to urge the inner gimbal 14 back to its central or normal position with respect to two planes at right angles to each other, there may be situations where it is desirable to bring it first into one plane and then into the other. That would only require a separate means for operating first one of the sets of restoring members as 30, 32 to bring the axis of the gimbal 14 into the plane of these members when closed to the position of Fig. 1 and another operating means for closing the other restoring members 50, 52 to bring the gimbal 14 into their plane, thus completing the restoring of the gyro in two steps instead of one. Thus in Fig. 3, the restoring members 130, 132 are operated by a lever 190 keyed thereon and a rod 192 while the restoring members 150, 152 are later independently operated by a lever 194 and a rod 196 to restore the gyro to a central position by two independent steps. Fig. 3 is otherwise the same as Fig. 1.

While I have shown and described but a few embodiments of my invention, it is to be understood that it is capable of many modifications. Changes, therefore, may be made which do not depart from the spirit and scope of my invention as disclosed in the appended claims.

I claim as my invention:

1. In a caging device for gyros, means for mounting the gyro to swing about two axes at right angles to each other, the rotor of the gyro being mounted on a shaft, pairs of semicircular members mounted to swing from opposite sides of the axis of said shaft toward a normal central position of the gyro shaft so as to urge the gyro shaft toward the central position from any other position, and means for simultaneously urging said semicircular members toward a common center.

2. In a caging device for gyros, means for mounting the gyro to swing about two axes at right angles to each other, the rotor of the gyro being mounted on a shaft, pairs of semicircular members mounted to swing from opposite sides of the axis of said shaft toward a normal central position of the gyro shaft so as to urge the gyro shaft toward the central position from any other position, and means for simultaneously urging said semicircular members toward a common center, the pairs of semicircular members when in closed position lying substantially at right angles to each other.

3. In a caging device for gyros, means for mounting the gyro to swing about two axes at right angles to each other, the rotor of the gyro being mounted on a shaft, pairs of semicircular members mounted to swing from opposite sides of the axis of said shaft toward a normal central position of the gyro shaft so as to urge the gyro shaft toward the central position from any other position, and means for simultaneously urging said semicircular members toward a common center, the pairs of semicircular members when in closed position lying substantially at right angles to each other and substantially at 45° from the axes of the mountings for the gyro.

4. In a caging device for gyros, means for mounting the gyro to swing about two axes at right angles to each other, the rotor of the gyro being mounted on a shaft, pairs of semicircular members mounted to swing from opposite sides of the axis of said shaft toward a normal central position of the gyro shaft so as to urge the gyro shaft toward the central position from any other position, and means for urging said semicircular members toward a common center, the axes about which the gyro is mounted to swing and the axes about which the semicircular members swing are located in substantially the same plane.

5. In a caging device for gyros, means for mounting the gyro to swing about two axes at right angles to each other, the rotor of the gyro being mounted on a shaft, pairs of semicircular members mounted to swing from opposite sides of the axis of said shaft toward a normal central position of the gyro shaft so as to urge the gyro shaft toward the central position from any other position, and means for urging said semicircular members toward a common center, the pairs of semicircular members when in closed position lying substantially at right angles to each other and substantially at 45° from the axes of the mountings for the gyro, the axes about which the gyro is mounted to swing and the axes about which the semicircular members swing are located in substantially the same plane.

6. In a caging device for gyros, means for mounting the gyro to swing about two axes at right angles to each other, the rotor of the gyro being mounted on a shaft, pairs of semicircular members mounted to swing from opposite sides of the axis of said shaft toward a normal central position of the gyro shaft so as to urge the gyro shaft toward the central position from any other position, and means for urging said semicircular members toward a common center, the pairs of semicircular members when in closed position lying substantially at right angles to each other.

7. In a caging device for gyros, means for mounting the gyro to swing about two axes at right angles to each other, the rotor of the gyro being mounted on a shaft, pairs of semicircular members mounted to swing from opposite sides of the axis of said shaft toward a normal central position of the gyro shaft so as to urge the gyro shaft toward the central position from any other position, and means for moving one of said pairs of members toward a normal central position to bring the axis of the gyro into that plane and then moving the other pair of said members toward each other to move the axis of the gyro in said plane to a given position in that plane.

GEORGE LONG.